(12) United States Patent
Tevonian

(10) Patent No.: US 9,641,557 B2
(45) Date of Patent: May 2, 2017

(54) METHOD FOR JOINING SIP COMMUNICATION DEVICES INTO AN EXISTING CALL

(75) Inventor: Gregory B. Tevonian, North Aurora, IL (US)

(73) Assignee: Alcatel Lucent, Boulogne-Billancourt (FR)

(*) Notice: Subject to any disclaimer, the term of this patent is extended or adjusted under 35 U.S.C. 154(b) by 840 days.

(21) Appl. No.: 12/654,019

(22) Filed: Dec. 8, 2009

(65) Prior Publication Data
US 2011/0134807 A1   Jun. 9, 2011

(51) Int. Cl.
H04L 12/18   (2006.01)
H04L 29/06   (2006.01)
H04L 12/66   (2006.01)

(52) U.S. Cl.
CPC ........ *H04L 65/1016* (2013.01); *H04L 65/103* (2013.01); *H04L 65/1006* (2013.01); *H04L 65/1093* (2013.01); *H04L 65/4046* (2013.01)

(58) Field of Classification Search
None
See application file for complete search history.

(56) References Cited

U.S. PATENT DOCUMENTS

| | | | |
|---|---|---|---|
| 6,683,870 B1* | 1/2004 | Archer | 370/356 |
| 7,965,309 B2* | 6/2011 | Mattila et al. | 348/14.08 |
| 8,086,254 B2* | 12/2011 | Silver et al. | 455/466 |
| 8,265,614 B2* | 9/2012 | Allen et al. | 455/415 |
| 2006/0121919 A1 | 6/2006 | Amishima et al. | |
| 2007/0165800 A1 | 7/2007 | Imura et al. | |
| 2007/0180123 A1* | 8/2007 | Bennett | 709/227 |
| 2007/0293220 A1* | 12/2007 | Mahler et al. | 455/435.1 |

(Continued)

FOREIGN PATENT DOCUMENTS

| | | |
|---|---|---|
| EP | 1146764 A2 | 10/2001 |
| JP | S59-17662 A | 1/1984 |

(Continued)

OTHER PUBLICATIONS

Gilles Bertrand—"The IP Multimedia Subsystem in Next Generation Networks", pp. 1-9, May 30, 2007.

(Continued)

*Primary Examiner* — Eunsook Choi
(74) *Attorney, Agent, or Firm* — Harness, Dickey & Pierce, P.L.C.

(57) ABSTRACT

Example embodiments provide a method and/or network element capable of joining SIP communication devices into an existing call. According to an example embodiment, a network element may join SIP communication devices by receiving an incoming call from a calling communication device and establishing a connection between the calling communication device and at least one associated communication device in a set of associated communication devices. The set of associated communication devices may be notified of the connection and a conference procedure may be performed in response to an unconnected communication device being activated, such that a multi-way conference connection is established between the calling communication device, the at least one associated communication device, and the at least one unconnected communication device.

18 Claims, 11 Drawing Sheets

(56) References Cited

U.S. PATENT DOCUMENTS

2009/0164583 A1\*  6/2009  Zhu .................... H04L 67/16
                                                709/205
2010/0061538 A1\*  3/2010  Coleman ............ H04L 12/1818
                                                379/202.01

FOREIGN PATENT DOCUMENTS

| JP | 2001-359174 A | 12/2001 |
|----|---------------|---------|
| JP | 2005-20286    | 1/2005  |
| JP | 2007-158737 A | 6/2007  |
| WO | WO 2007/149611 | 12/2007 |
| WO | WO-2009/088814 A2 | 7/2009 |

OTHER PUBLICATIONS

A Vemuri—Session Initiation Protocol for Telephones (SIP-T): Context and Architectures, Sep. 2002.
International Search Report and Written Opinion dated Apr. 8, 2011.
Chinese Office Action dated Apr. 2, 2014 in corresponding Application No. 201080055408.9.
Japanese Office Action dated Oct. 20, 2014 for corresponding Application No. JP 2012-543131.
Japanese Notice of Reason for Refusal dated Nov. 21, 2013 for related Japanese Application No. 2012-543131 (full translation provided).
Office Action for corresponding to the Chinese Application No. 201080055408.9 dated Jan. 26, 2015, and English translation thereof.

\* cited by examiner

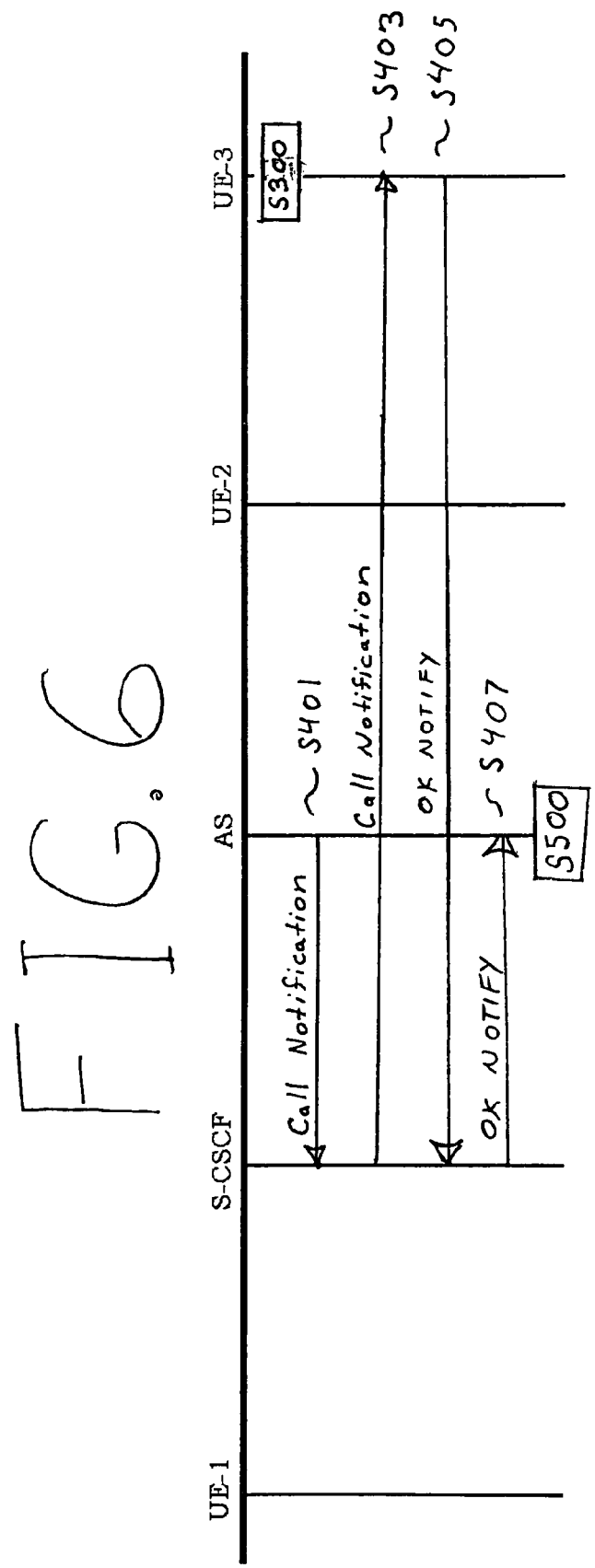

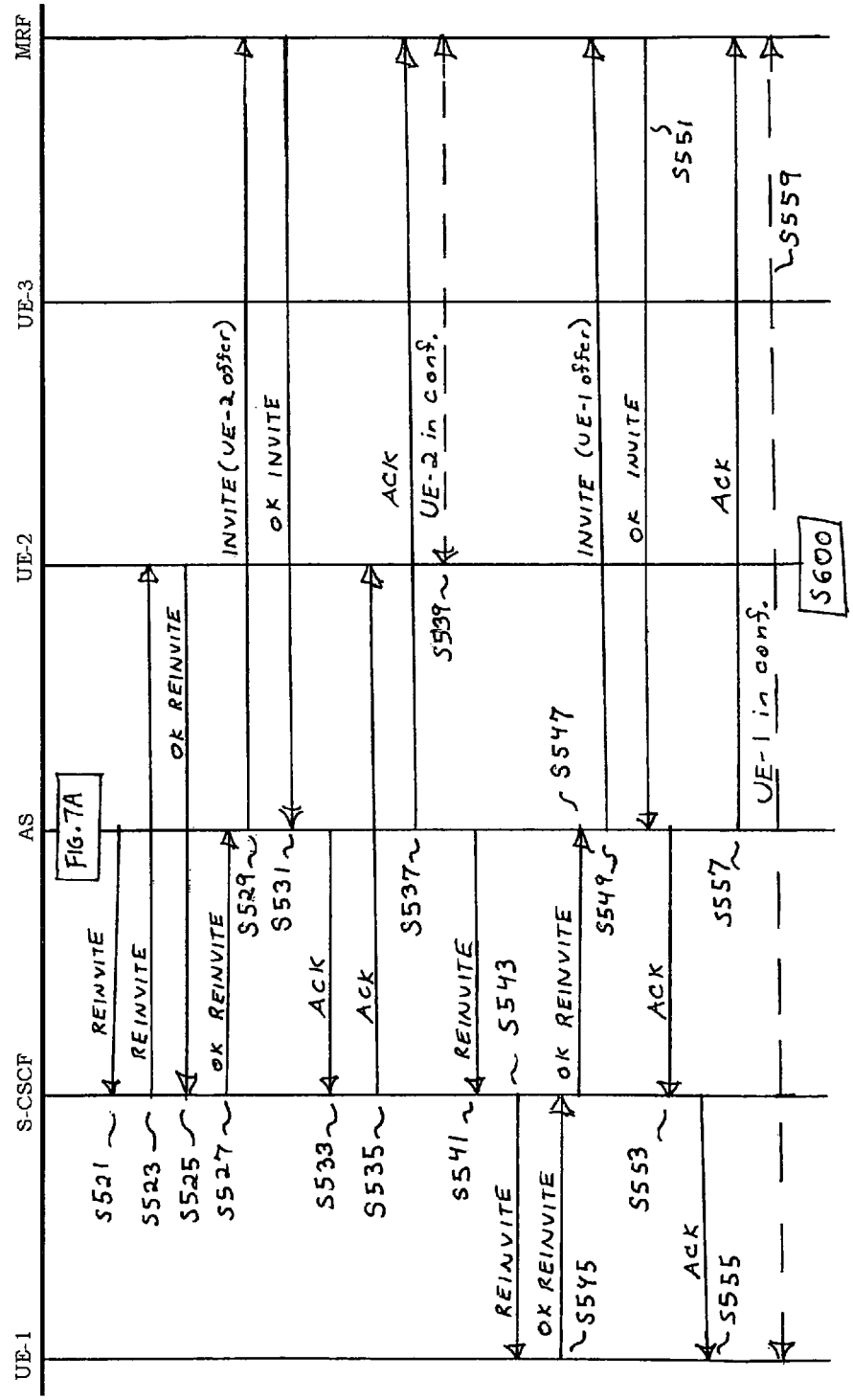

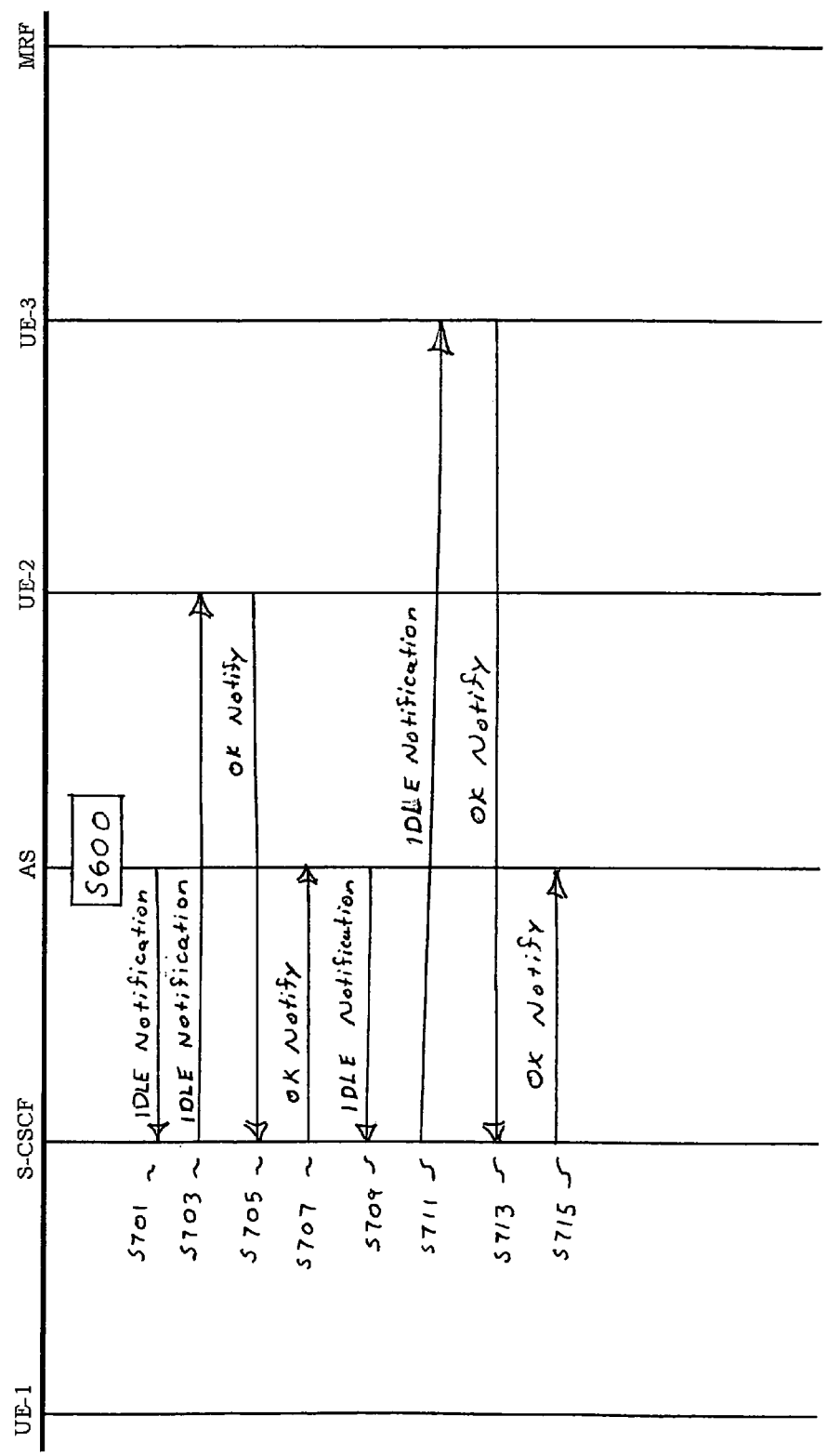

METHOD FOR JOINING SIP COMMUNICATION DEVICES INTO AN EXISTING CALL

BACKGROUND

A conventional Internet Protocol Multimedia Subsystem (IMS) network is an architectural framework for delivering Internet Protocol (IP) services. The conventional IMS network may implement a signaling protocol to establish, modify, and/or terminate various forms of communication. One type of signaling protocol may be Session Initiation Protocol (SIP).

In a conventional IMS/SIP network, a set of user equipments (UEs) may use SIP and have a shared phone number. To distinguish each of the set of conventional UEs with the shared phone number, the set of conventional UEs may also undertake a registration procedure. The registration procedure may allow each UE to be assigned a unique contact address. Network elements in the conventional IMS/SIP network may use the unique contact address to send an INVITE request to each conventional UE when there is an incoming call to the shared phone number, such that the set of conventional UEs ring simultaneously. This allows a subscriber to answer the incoming call at any of the conventional UEs.

Nevertheless, a shortcoming of the conventional IMS/SIP network is that once the incoming call has been answered by a first person at a first conventional UE, a second person cannot simply pick up a second conventional UE to join the call, despite the fact that both conventional UEs have a shared phone number. Instead, the second person must dial a special access code from the second conventional UE to join the call. This deficiency stands in contrast to traditional Public Switched Telephone Network (PSTN) phone service, where the second person can pick up a handset at any other phone with the shared phone number to immediately join the call. Such a difference in operation by telephony devices in the conventional IMS/SIP network may be viewed as a critical deficiency by telecommunications providers and end users that expect feature transparency when migrating from PSTN to VoIP.

SUMMARY OF THE INVENTION

Example embodiments provide a method and/or network element capable of joining SIP communication devices into an existing call.

According to an example embodiment, a network element may join SIP communication devices by receiving an incoming call from a calling communication device and establishing a connection between the calling communication device and at least one associated communication device in a set of associated communication devices. The set of associated communication devices may be notified of the connection and a conference procedure may be performed in response to an unconnected communication device being activated, such that a multi-way conference connection is established between the calling communication device, the at least one associated communication device, and the at least one unconnected communication device.

According to further example embodiments, a notification apparatus may include an application server. The application server may be configured to: receive an incoming call from a calling communication device; establish a connection between the calling communication device and at least one associated communication device in a set of associated communication devices; notify at least one unconnected communication device of the connection; perform a conference procedure in response to an unconnected communication device being activated, such that a multi-way conference connection is established between the calling communication device, the at least one associated communication device, and the at least one unconnected communication device; and send an idle notification to each of the set of associated communication devices when the shared line is available.

BRIEF DESCRIPTION OF THE DRAWINGS

The accompanying figures are included to provide a further understanding of example embodiments, and are incorporated in and constitute part of this specification. In the figures:

FIG. 6 is a signal flow diagram further defining step S400 of FIG. 2 according to an example embodiment.

FIGS. 7A-7B are signal flow diagrams further defining step S500 of FIG. 2 according to an example embodiment.

FIG. 9 is a signal flow diagram further defining step S700 of FIG. 2 according to an example embodiment.

DETAILED DESCRIPTION OF THE EMBODIMENTS

In the following description, for purposes of explanation and not limitation, specific details are set forth such as particular architectures, interfaces, techniques, etc., in order to provide a thorough understanding of the example embodiments. However, it will be apparent to those skilled in the art that the disclosed subject matter may be practiced in other illustrative embodiments that depart from these specific details. In some instances, detailed descriptions of well-known devices and/or methods are omitted so as not to obscure the description with unnecessary detail. All principles, aspects, and embodiments, as well as specific examples thereof, are intended to encompass both structural and functional equivalents of the disclosed subject matter. Additionally, it is intended that such equivalents include both currently known equivalents as well as equivalents developed in the future.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term "user equipment (UE)" may be synonymous to mobile user, user, subscriber, wireless terminal and/or remote station and may describe a remote user of wireless resources in a wireless communication network.

The following description relates to a network based on 3GPP and/or related technologies. However, it should be noted that the example embodiments shown and described herein are meant to be illustrative only and not limiting in any way. As such, various modifications will be apparent to those skilled in the art for application to communication systems or networks based on technologies other than the above, which may be in various stages of development and intended for future replacement of, or use with, the above networks or systems.

Although current network architectures may consider a distinction between mobile/user devices and access points/base stations, the example embodiments described hereafter may generally be applicable to architectures where that distinction is not so clear, such as ad hoc and/or mesh network architectures, for example.

Figure 1:
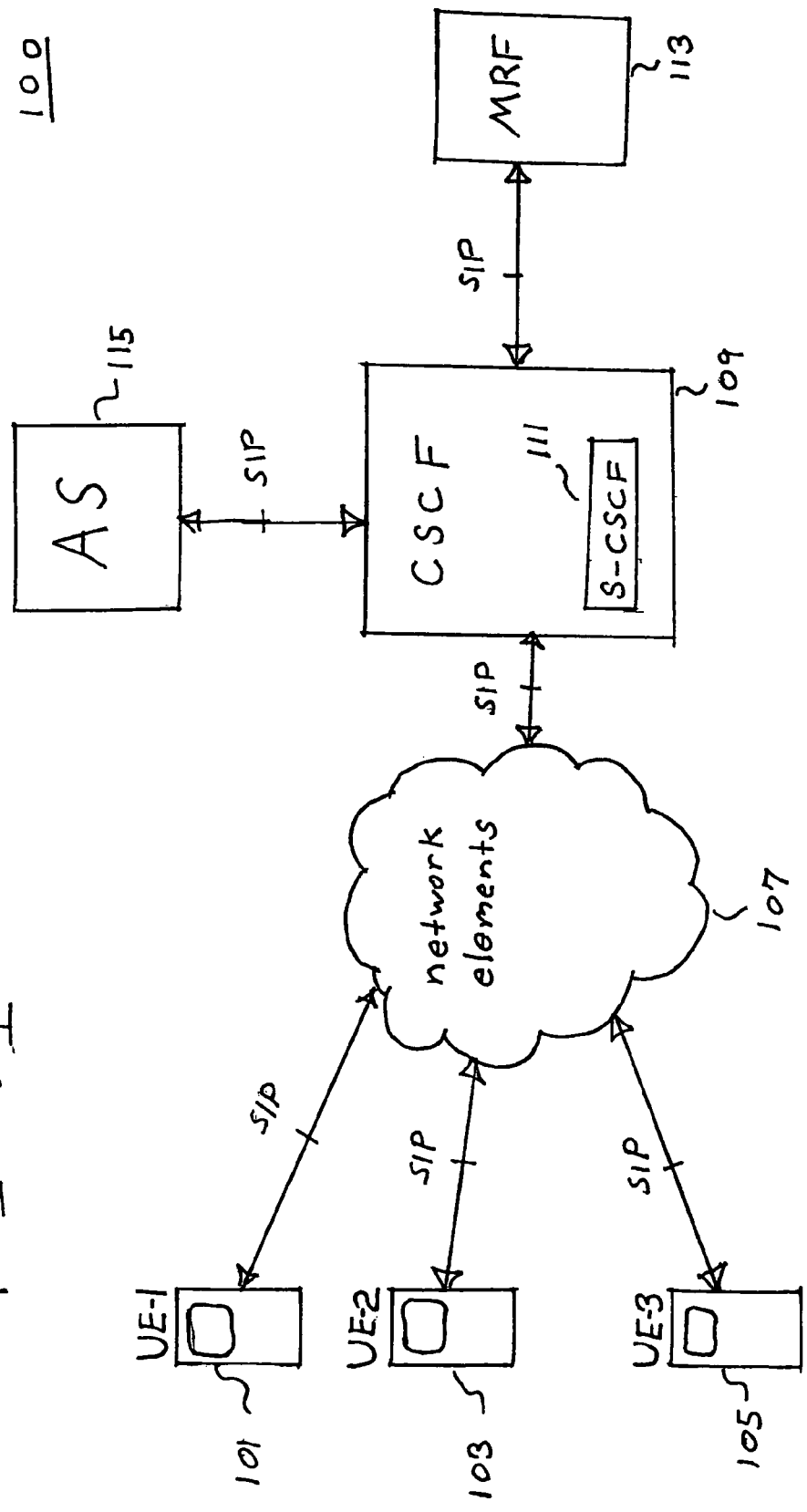
FIG. 1 illustrates an IMS network according to an example embodiment.

FIG. 1 illustrates an IMS network 100 according to an example embodiment. For illustrative purposes, FIG. 1 includes three UEs (101, 103, and 105). A first user equipment (UE-1 101) may be a calling communication device, whereas a second (UE-2 103) and third (UE-3 105) user equipment may be associated with each other by a shared identifier. The shared identifier may be, but is not limited to, a shared phone number and/or a shared Uniform Resource Identifier (URI) field. The associated UEs (UE-2 103 and UE-3 105) may each individually register with the IMS network 100.

The UEs use SIP to communicate with a Call Session Control Function (CSCF) 109. The CSCF 109 may be a collection of SIP servers and/or proxies used to process SIP signaling packets in the IMS network 100. The CSCF may include a Proxy-CSCF (P-CSCF), a Serving-CSCF (S-CSCF), and an Interrogating-CSCF (I-CSCF). The P-CSCF may be a first point of contact. Messages sent and/or received by a UE in the IMS network 100 travel through the P-CSCF. The S-CSCF may be a central node in the SIP signaling plane. The I-CSCF may be a querying function. Incoming calls (e.g., SIP INVITE requests) travel through the I-CSCF. For simplicity's sake, only the S-CSCF will be discussed in greater detail. In the IMS network 100, the CSCF 109 includes an S-CSCF 111. The UEs' communication with the S-CSCF 111 is discussed further below.

Communications between the UEs and the S-CSCF 111 traverse various network elements 107. However, each intermediate element constituting the various network elements 107 are not shown in order to increase clarity. The various network elements 107 may include, but are not limited to: (i) access networks (e.g., Digital Subscriber Line Access Multiplexer, etc.), (ii) gateways (e.g., Border Gateway, IMS Gateway, Signaling Gateway, Media Gateway, etc.), and (iii) any other intermediary IMS elements (Network Attachment Subsystem, Building Automation System, Access-Resource and Admission Function, Policy Decision Function, Service-Based Policy Decision Function, etc.)

The S-CSCF 111 utilizes the SIP to communicate with an Application Server (AS) 115 and a Media Resource Function (MRF) 113. The AS 115 may be an SIP entity that executes various services provided to the UEs. The AS 115 may also be aware that the associated UEs (UE-2 103 and UE-3 105) have a shared identifier. The AS 115 may become aware of this fact if, or when, the associated UEs register with the IMS network 100. On the other hand, the MRF 113 may provide media related functions (e.g., a multi-way conference connection, media manipulation, announcements, etc.). The MRF 113 may include a Media Resource Function Controller (MRFC) and a Media Resource Function Processor (MRFP). The MRFC may act as an SIP user agent to the S-CSCF 111. The MRFP may implement the actual media related functions.

Figure 2:
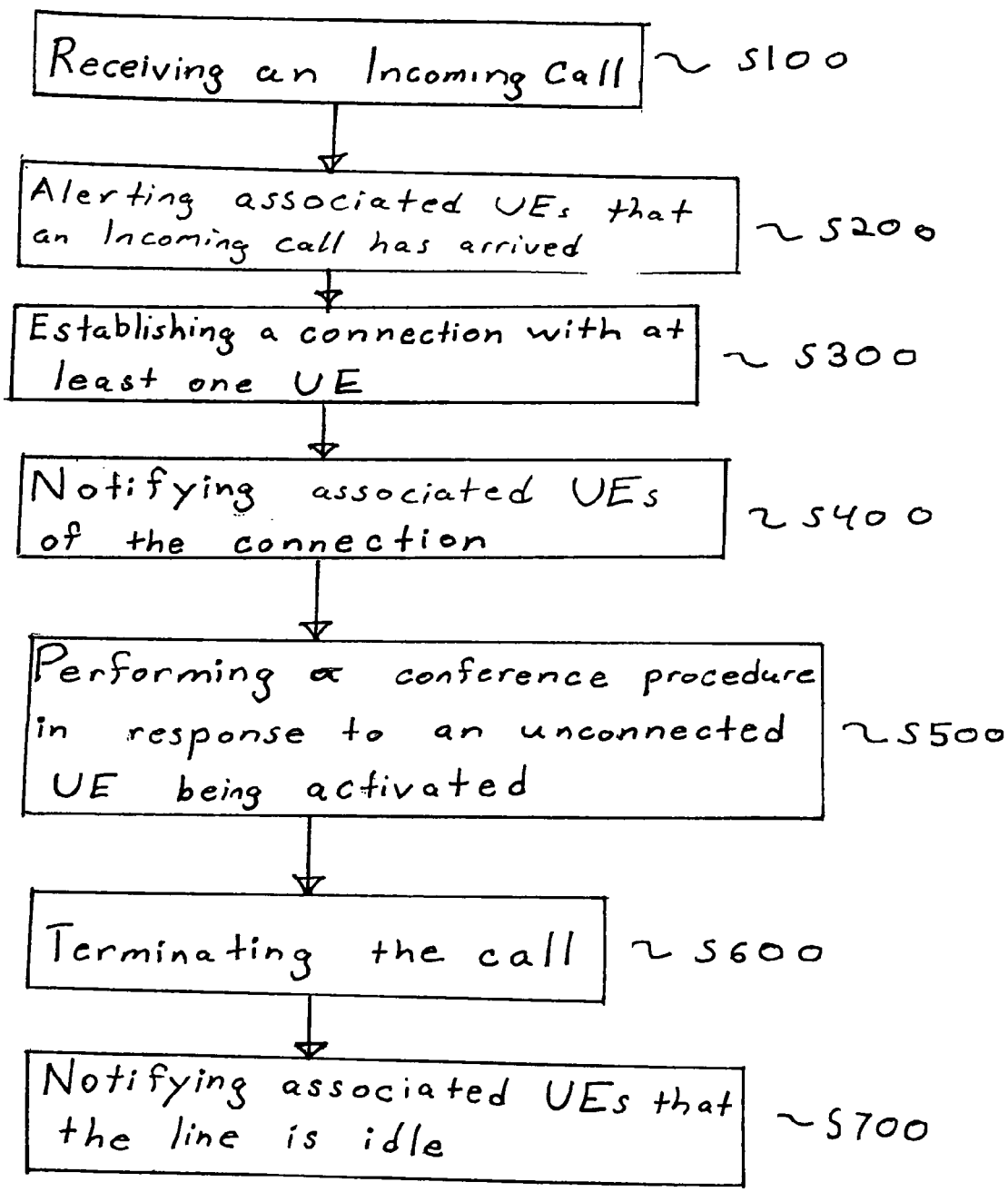
FIG. 2 illustrates a method of joining SIP communication devices into an existing call according to an example embodiment.

FIG. 2 illustrates a method of joining SIP communication devices into an existing call according to an example embodiment. For the purpose of explanation, the method described in FIG. 2 can be implemented in the network architecture illustrated in FIG. 1, but is not limited to this implementation. Therefore, reference numerals from FIG. 1 are not necessarily used in FIG. 2.

In step S100, an incoming call from a calling UE is received. The call may be received by the AS. Once the call is received, associated UEs are alerted that the incoming call has arrived, per step S200. Next, in step S300, a connection between the calling UE and at least one of the associated UEs is established. Step S300 may also include terminating a call session with the unconnected associated UE. Once a connection is established, the associated UEs are notified of the connection, per step S400. In step S500, a conference procedure is performed in response to an unconnected UE being activated. The conference procedure may automatically add the calling UE, the associated at least one connected UE, and the initially unconnected UE into a multi-way conference call. When the multi-way conference call comes to a close, the call may be terminated per step S600. Finally, in step S700 the associated UEs are once again notified that the line is idle.

Figure 3:
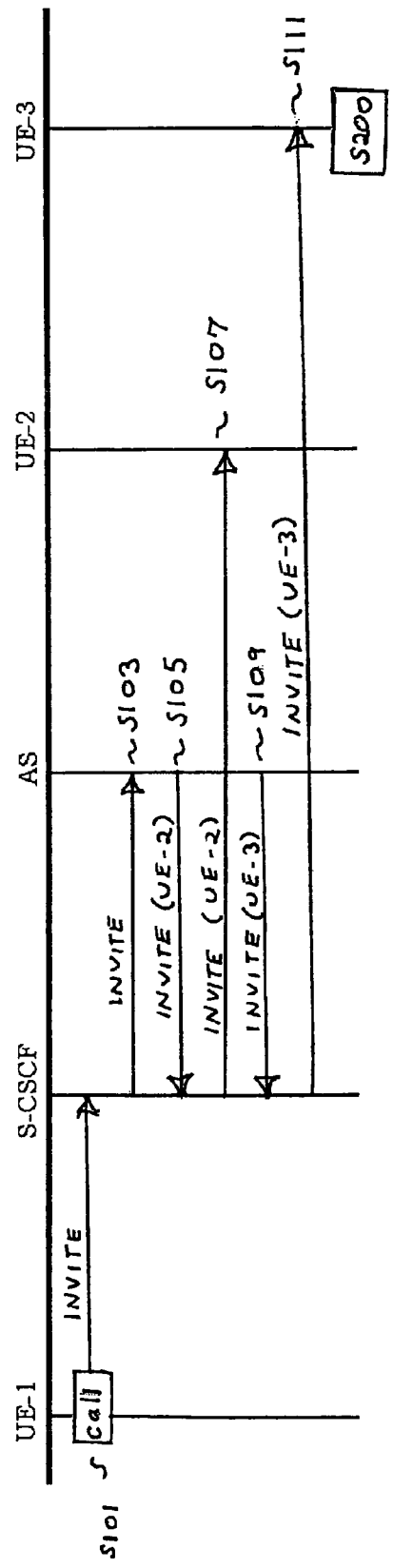
FIG. 3 is a signal flow diagram further defining step S100 of FIG. 2 according to an example embodiment.

FIG. 3 is a signal flow diagram further defining step S100 of FIG. 2 according to an example embodiment. For the purpose of explanation, the method described in FIG. 3 can be implemented in the network architecture illustrated in FIG. 1, but is not limited to this implementation. Therefore, reference numerals from FIG. 1 are not necessarily used in FIG. 3.

In FIG. 3, a calling UE (UE-1) sends an INVITE request to the S-CSCF in step S101. The INVITE request may be the incoming call. The destination address of the INVITE request may be the shared identifier. Next, in step S103 the S-CSCF forwards the INVITE request to the AS. As previously indicated when discussing FIG. 1, associated UEs with the shared identifier (UE-2 and UE-3) may register with the AS. Thus, each of the associated UEs may be assigned a unique public identity. The unique public identity may also be a URI field. Accordingly, in step S105 the AS may forward an INVITE request to the S-CSCF that is intended to be received by the associated UE-2. The INVITE request may include a unique public identity corresponding to the UE-2. The S-CSCF may be aware that the INVITE request is intended to go to the UE-2 based on the unique public identity. Therefore, the S-CSCF forwards the INVITE request to the associated UE-2, per step S107. Similarly, in step S109 the AS forwards an INVITE request, which includes a unique public identity corresponding to the associated UE-3 request, to the S-CSCF. The S-CSCF forwards the INVITE request to the associated UE-3, per step S111. It should be noted that steps S105, S107, S109, and S111 may be performed simultaneously. Also, the AS may then track outstanding INVITE requests sent to associated UEs (UE-2 and UE-3).

Figure 4:
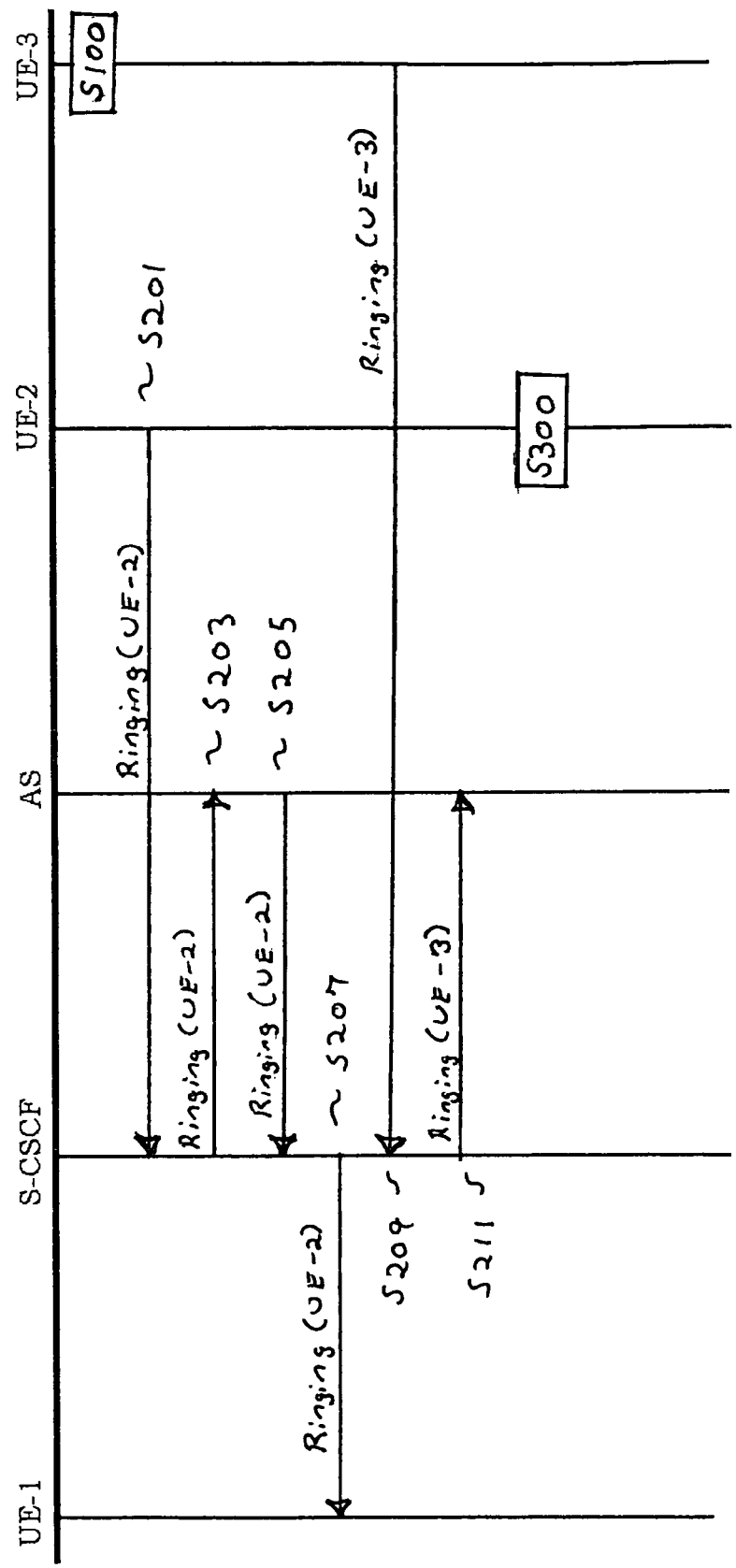
FIG. 4 is a signal flow diagram further defining step S200 of FIG. 2 according to an example embodiment.

FIG. 4 is a signal flow diagram further defining step S200 of FIG. 2 according to an example embodiment. For the purpose of explanation, the method described in FIG. 4 can be implemented in the network architecture illustrated in FIG. 1, but is not limited to this implementation. Therefore, reference numerals from FIG. 1 are not necessarily used in FIG. 4.

Once the associated UEs receive the INVITE requests as previously discussed in FIG. 3, the associated UEs may send ringing alerts to the AS. More specifically, the associated UE-2 sends a ringing alert to the S-CSCF in step S201. The S-CSCF forwards this ringing alert to the AS. Once received by the AS, the AS forwards the associated UE-2's ringing alert to the S-CSCF, as shown in step S205. The ringing alert forwarded by the AS is intended to be received by the calling UE-1, per step S207. This process may then be repeated is respect to the associated UE-3. More specifically, in step S209 the associated UE-3 sends its own ringing announcement to the S-CSCF. The ringing announcement is forwarded to the AS from the S-CSCF, per step S211. The AS may then forward the ringing announcement to the UE-1 (not shown).

Figure 5:
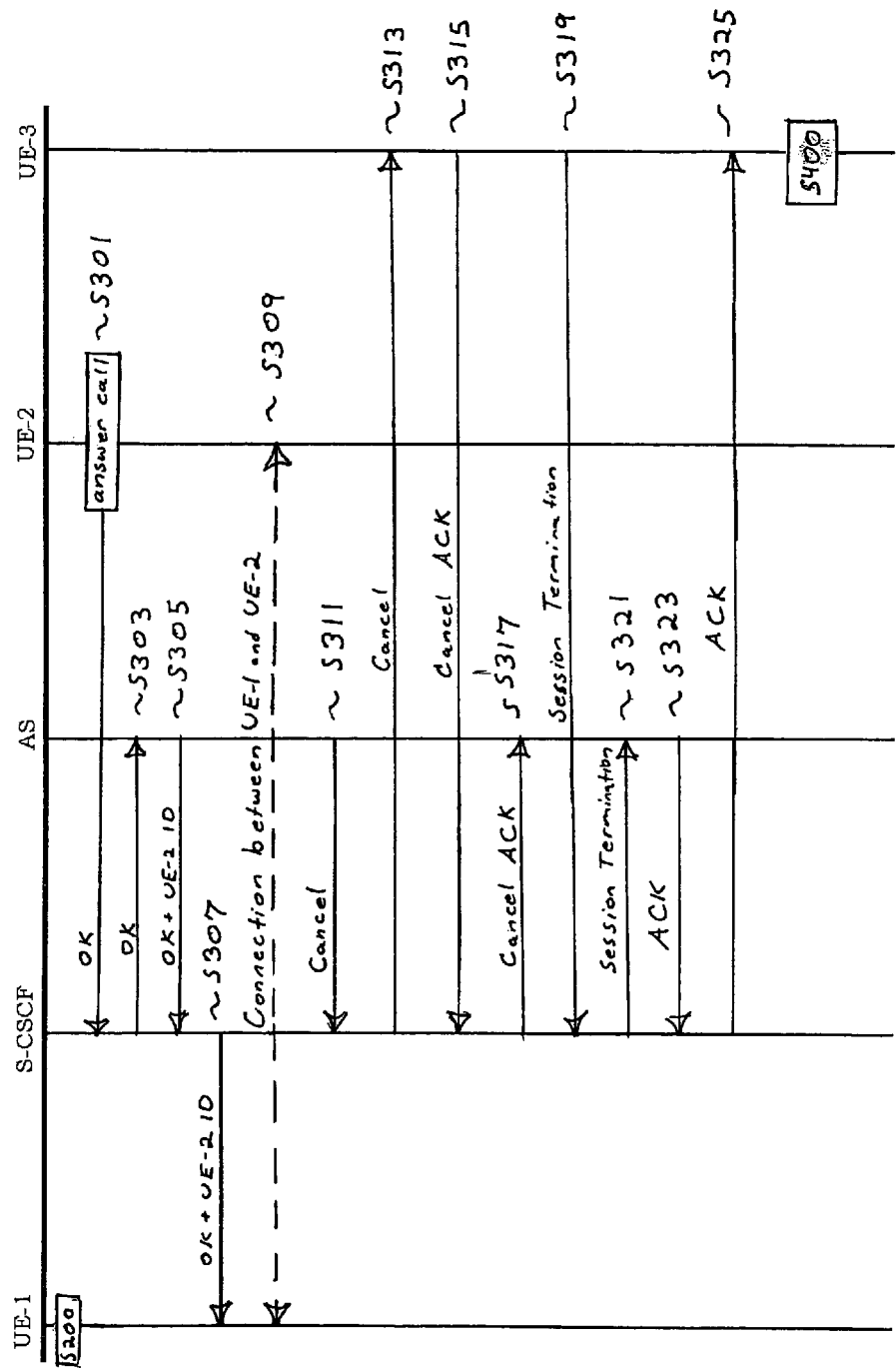
FIG. 5 is a signal flow diagram further defining step S300 of FIG. 2 according to an example embodiment.

FIG. 5 is a signal flow diagram further defining step S300 of FIG. 2 according to an example embodiment. For the purpose of explanation, the method described in FIG. 5 can be implemented in the network architecture illustrated in FIG. 1, but is not limited to this implementation. Therefore, reference numerals from FIG. 1 are not necessarily used in FIG. 5.

Eventually, after the ringing alerts are sent by the associated UEs, a subscriber will activate at least one of the associated UEs (e.g., answer the call). In step S301, the associated UE-2 answers the call and sends an answer confirmation to the S-CSCF. In FIG. 5 the answer confirmation is an "OK" message. The OK message may include an answer in a format for describing streaming media initialization parameters (e.g., a Session Description Protocol answer). The S-CSCF forwards the OK message to the AS in step S303. In step S305, the AS forwards an OK message with a UE-2 identifier to the S-CSCF. The UE-2 identifier may include the SDP answer from the UE-2. In step S307, the S-CSCF forwards an OK message, along with the UE-2 identifier, to the UE-1. As previously stated, the UE-1 is the calling UE. Accordingly, a connection between the UE-1 and the UE-2 is established thereafter, per step S309.

Also, a call session with the associated UE-3 (the unconnected associated UE) may be terminated. More specifically, the AS may cancel the outstanding INVITE with the unconnected associated UE-3. In step S311, the AS sends a cancellation message to the S-CSCF. The cancellation message may be a SIP CANCEL message. The cancellation message is forwarded by the S-CSCF to the UE-3 in step S313. In response, the unconnected associated UE-3 sends a cancellation acknowledgment (ACK) back to the S-CSCF, per step S315. The cancellation acknowledgement may be an SIP OK CANCEL message. The S-CSCF forwards the cancellation to the AS in step S317. Also, the unconnected associated UE-3 sends a session termination message to the S-CSCF as well, per step S319. The session termination message may confirm that session corresponding to the outstanding INVITE is terminated. In step S321, the S-CSCF forwards the session termination message to the AS. The AS then responds by sending an ACK back to the S-CSCF (step S323), which the S-CSCF forwards to the unconnected associated UE-3 (step S325).

FIG. 6 is a signal flow diagram further defining step S400 of FIG. 2 according to an example embodiment. For the purpose of explanation, the method described in FIG. 6 can be implemented in the network architecture illustrated in FIG. 1, but is not limited to this implementation. Therefore, reference numerals from FIG. 1 are not necessarily used in FIG. 6.

Once the call is answered per FIG. 5, the AS may notify all the associated UEs of the connection between the calling UE-1 and the associated UE-2. FIG. 6 illustrates this notifying procedure. More specifically, in step S401 the AS sends a call notification message to the S-CSCF. The call notification message may be a SIP NOTIFY request. The call notification message may also be used by the unconnected UE-3 to inform a subscriber that the line is busy and/or active. For example, a call notification message may be used to activate a light source and/or some other computerized form of subscriber notification, similar to conventional PSTN phones (e.g., an "in use," or "call in progress," light).

In step S403, the S-CSCF forwards the call notification message to the unconnected associated UE-3. However, the AS may also forward the call notification message to the connected associated UE-2 (not shown). In response, in step S405 the unconnected UE-3 sends a confirmation OK NOTIFY message to the S-CSCF. The S-CSCF forwards the OK NOTIFY message to the AS, per step S407.

Figure 7A:
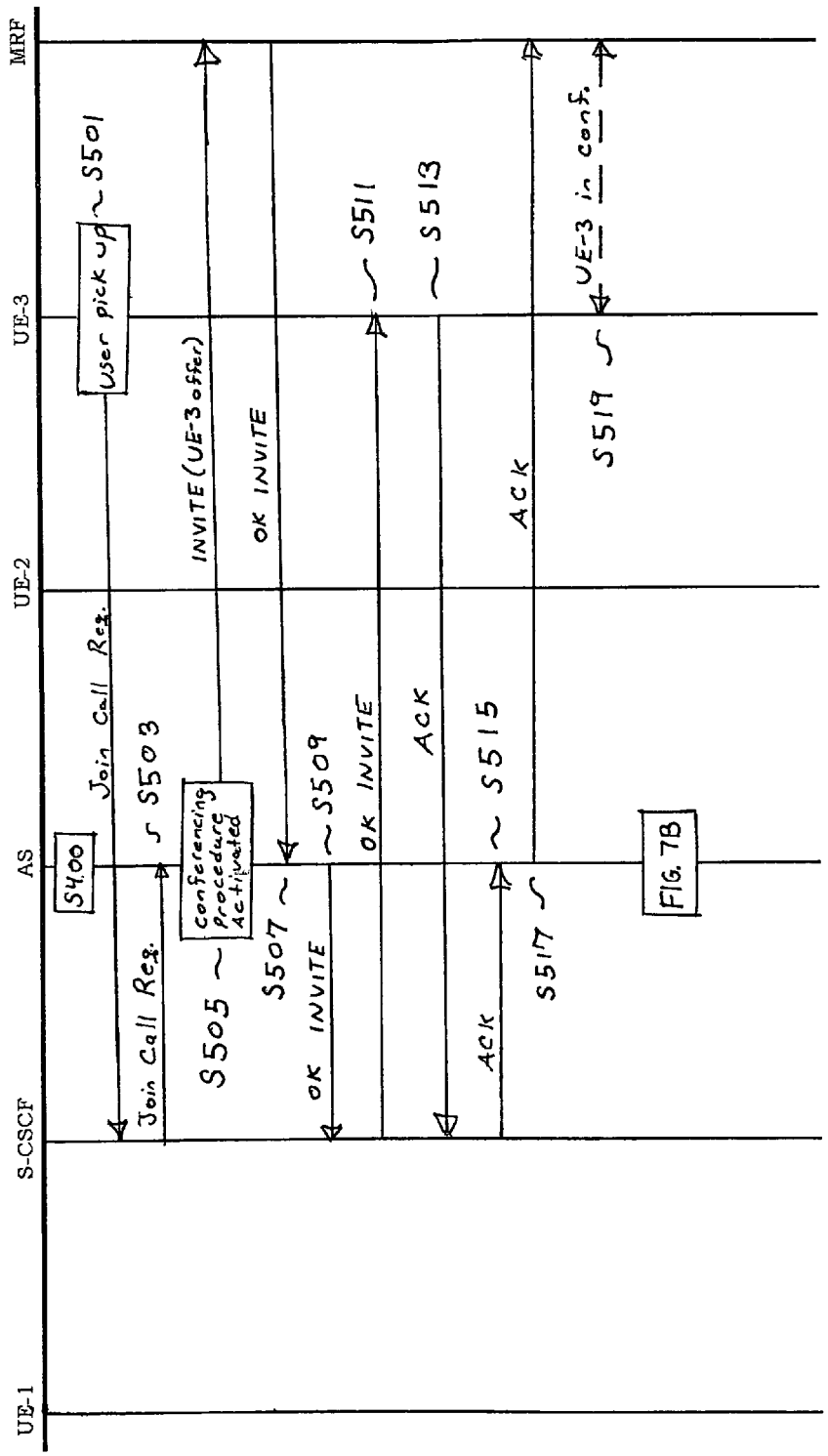

FIGS. 7A-7B are signal flow diagrams further defining step S500 of FIG. 2 according to an example embodiment. For the purpose of explanation, the method described in FIGS. 7A-7B can be implemented in the network architecture illustrated in FIG. 1, but is not limited to this implementation. Therefore, reference numerals from FIG. 1 are not necessarily used in FIGS. 7A-7B.

Once the unconnected UE-3 receives the call notification message, the unconnected UE-3 may be activated (e.g., user picks up a UE-3 handset). A conference procedure may be automatically initiated after the UE-3 is activated. In FIG. 7A, step S501 illustrates a join call request being sent by the unconnected UE-3 to the S-CSCF. The join call request is sent in response to the UE-3 being picked up by a user and/or subscriber. The join call request may be a SIP INVITE request. Also, the SIP INVITE request may include a special value in the SIP URI field. The S-CSCF then forwards the join call request to the AS in step S503.

If, or when, the AS receives the join call request, it may activate a conferencing procedure to join the calling UE-1 and all the associated UEs with the shared identifier. The conference may be a multi-way conference connection, such that all the parties may be joined. The parties may be joined using the MRF. In step S505 of FIG. 7A, an INVITE message is sent from the AS to the MRF. The INVITE message includes an offer, with a UE-3 identifier, to enter into a conference connection. The offer may be an SDP offer from the UE-3. The MRF may respond by sending a confirmation of the INVITE message. In FIG. 7A, the confirmation is an OK INVITE message sent to the AS, per step S507. The OK INVITE may include an SDP answer from the MRF. Next, in step S509, the AS forwards the OK INVITE from the MRF to the S-CSCF. The S-CSCF forwards the OK INVITE to the unconnected associated UE-3, per step S511. The unconnected associated UE-3 responds by sending an ACK back to the S-CSCF (step S513), which is then forwarded to the AS (step S515). In step S517, the AS forwards the ACK to the MRF. As a result, the previously unconnected UE-3 is now joined to the multi-way conference connection, per step S519.

Next, the calling UE-1 and the connected associated UE-2 may also be joined to the multi-way conference connection, as shown in FIG. 7B. More specifically, the AS sends a REINVITE message to the S-CSCF, per step S521. The REINVITE message may not include an SDP message. In step S523, the S-CSCF forwards the REINVITE message to the connected associated UE-2. The UE-2 may respond by sending a confirmation of the REINVITE message. In FIG. 7B, the confirmation is an OK REINVITE message sent to the S-CSCF, as shown in step S525. The OK REINVITE may include an SDP offer. The S-CSCF then forwards the OK REINVITE to the AS, per step S527. Next, in step S529 the AS sends an INVITE message, with an offer from the connected associated UE-2, to the MRF. The MRF confirms the INVITE by responding with an OK INVITE message sent to the AS, as shown in step S531. Thereafter, the AS sends an ACK to the S-CSCF (step S533), which is forwarded by the S-CSCF to the connected associated UE-2 (step S535). The AS also sends an ACK to the MRF, per step S537. In this manner, the connected associated UE-2 is also joined to the multi-way conference connection alongside the previously unconnected associated UE-3 as shown in step S539.

The calling UE-1 may be joined to the multi-way conference connection in the same manner to that of the connected associated UE-2. In step S541 the AS sends a REINVITE message to the S-CSCF, which is thereafter forwarded by the S-CSCF to the calling UE-1 in step S543. The REINVITE message may not include an SDP message. Upon receipt of the REINVITE message, the calling UE-1 responds by sending an OK REINVITE message to the S-CSCF (step S545), which is forwarded by the S-CSCF to the AS (step S547). Next, in step S549 the AS sends an INVITE message, with an offer from the calling UE-1, to the MRF. The MRF confirms the INVITE by responding with an OK INVITE message sent to the AS, as shown in step S551. The AS sends an ACK to the S-CSCF (step S553), which is forwarded by the S-CSCF to the connected associated UE-2 (step S555). The AS also sends an ACK to the MRF, per step S557. In this manner, the calling UE-2 is also joined to the multi-way conference connection alongside the connected associated UE-2 and the previously unconnected associated UE-3, as shown in step S559.

Figure 8A:
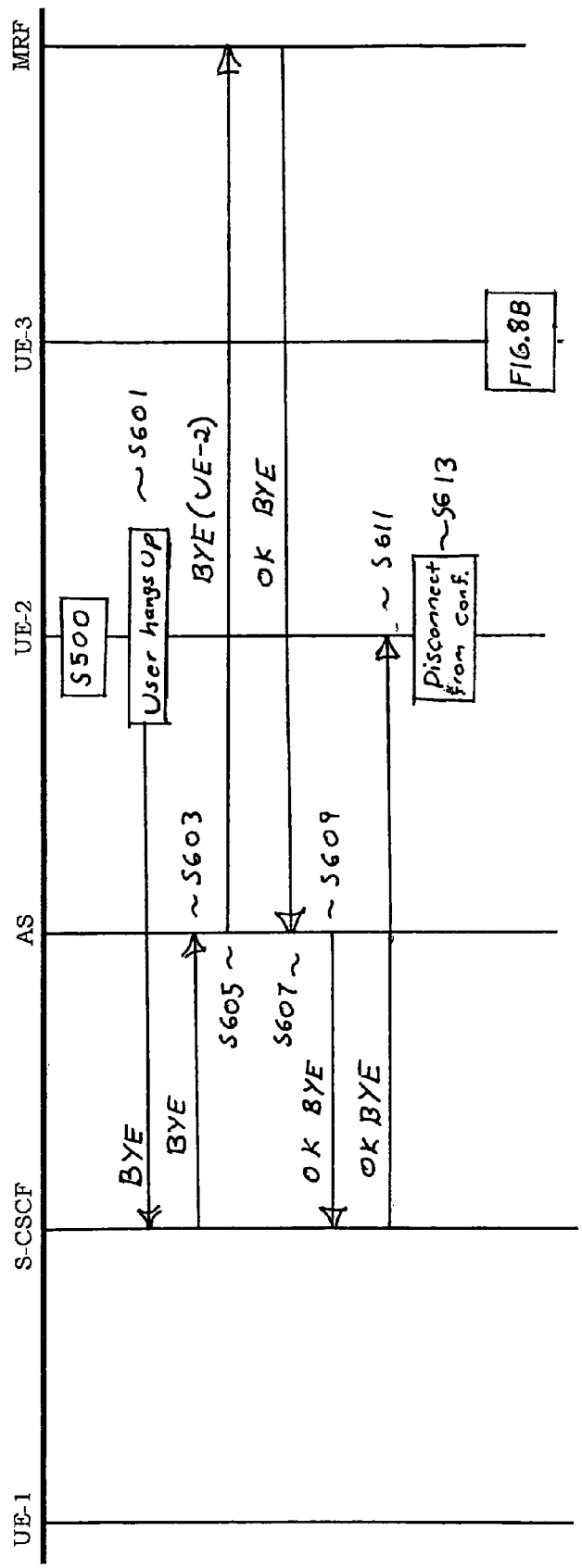
FIGS. 8A-8B are signal flow diagrams further defining step S600 of FIG. 2 according to an example embodiment.
Figure 8B:
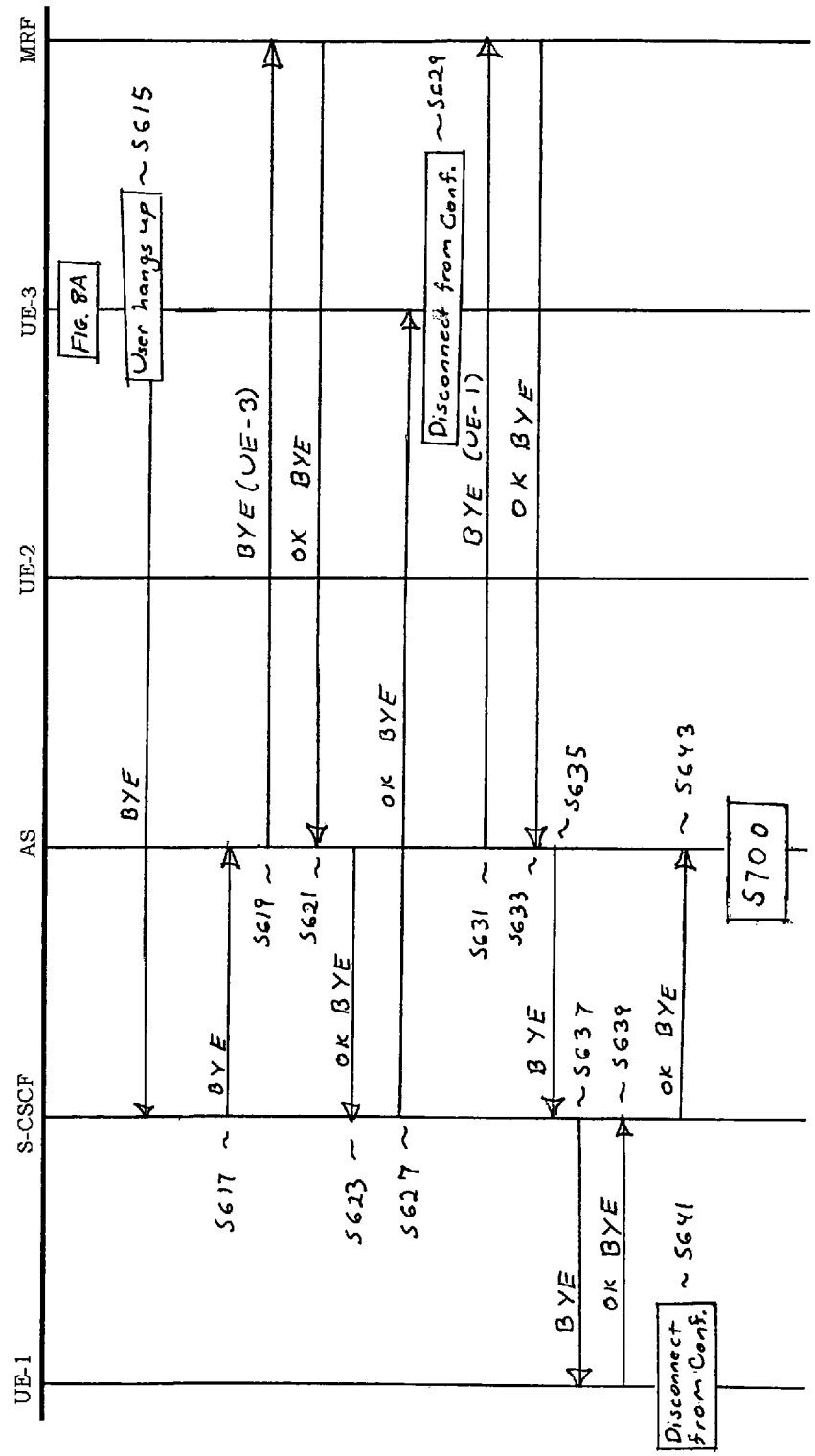

FIGS. 8A-8B are signal flow diagrams further defining step S600 of FIG. 2 according to an example embodiment. For the purpose of explanation, the method described in FIGS. 8A-8B can be implemented in the network architecture illustrated in FIG. 1, but is not limited to this implementation. Therefore, reference numerals from FIG. 1 are not necessarily used in FIGS. 8A-8B.

At the close of the above described multi-way conference connection, the multi-way conference connection may then be terminated. Each of the associated UEs may disconnect simultaneously or at different intervals. For example, the connected UE-2 may disconnect from the multi-way conference connection while the calling UE-1 and the previously unconnected UE-3 may remain in the multi-way conference connection. In an alternative embodiment, the calling UE-1 and the previously unconnected UE-3 may be transferred to a connection other than the multi-way conference connection when the connected UE-2 disconnects.

FIG. 8A illustrates an example embodiment of the connected UE-2 disconnecting from the multi-way conference connection while the calling UE-1 and the previously unconnected UE-3 remain in the multi-way conference connection. More specifically, the connected associated UE-2 (now a terminating associated UE-2) hangs up, causing a BYE message to be sent from the associated UE-2 to the S-CSCF, as shown in step S601. In step S603, the S-CSCF forwards the BYE message to the AS. The AS, being informed that the terminating associated UE-2 intends to disconnect from the multi-way conference connection, forwards the BYE message to the MRF as shown in step S605. The BYE message may include information corresponding to the terminating associated UE-2. In FIG. 8A, the corresponding information is dialog from the terminating associated UE-2 to the MRF. The MRF responds in step S607 by sending a confirmation OK BYE message to the AS, which the AS forwards to the S-CSCF in step S609. The S-CSCF likewise forwards the confirmation OK BYE message to the terminating associated UE-2 in step S611. Upon receipt of the confirmation OK BYE message, the terminating associated UE-2 is disconnected from the multi-way conference connection as shown in step S613, such that only the calling UE-1 and the previously unconnected associated UE-3 remain in the multi-way conference connection. Accordingly, because the multi-way conference connection still exists, all unconnected associated UEs may still be notified that the line remains active.

Eventually, the multi-way conference connection may be completely terminated by the remaining UEs in the multi-way conference connection. In FIG. 8B, the previously unconnected UE-3 (now terminating associated UE-3) hangs up in step S615, causing a BYE message to be sent to the S-CSCF. The S-CSCF forwards the BYE message to the AS, as shown in step S-617. The AS then forwards the BYE message, along with dialog from the terminating associated UE-3, to the MRF as shown in step S619. The MRF responds in step S621 by sending a confirmation OK BYE message to the AS, which the AS forwards to the S-CSCF in step S623. The S-CSCF likewise forwards the confirmation OK BYE message to the terminating associated UE-3 in step S627. Upon receipt of the confirmation OK BYE message, the terminating associated UE-3 is disconnected from the multi-way conference connection as shown in step S629.

The calling UE-1 may be disconnected from the multi-way conference connection in a similar fashion to the above described terminating associated UEs. However, because the calling UE-1 is the last remaining UE in the multi-way conference connection, the AS may initiate the termination process. More specifically, the AS sends a BYE message, with dialog from the calling UE-1, to the MRF as shown in step S631. The MRF responds in step S633 by sending a confirmation OK BYE message to the AS. Because the AS initiated the call termination process with respect to the calling UE-1, in step S635 the AS sends to the S-CSCF a BYE message, which the S-CSCF forwards to the calling UE-1 in step S37. Upon receipt of the BYE message, the calling UE-1 sends its own confirmation OK BYE message to the S-CSCF in step S639, which the S-CSCF forwards to the AS in step S643. The calling UE-1 also disconnects from the multi-way conference connection in step S641, such that the multi-way conference connection is terminated.

FIG. 9 is a signal flow diagram further defining step S700 of FIG. 2 according to an example embodiment. For the purpose of explanation, the method described in FIG. 9 can be implemented in the network architecture illustrated in FIG. 1, but is not limited to this implementation. Therefore, reference numerals from FIG. 1 are not necessarily used in FIG. 9.

After a UE connection (e.g., the multi-way conference connection) is disconnected, the associated UEs may be notified that the line corresponding to the shared phone number is idle. For example, in step S701 of FIG. 9 the AS sends a line-idle notification to the S-CSCF, which in step S703 the S-CSCF forwards to the associated UE-2. As previously discussed with respect to FIG. 8A, the associated UE-2, which is currently idle, may then respond with a confirmation message. For example, in FIG. 9 the associated UE-2 responds by sending an OK NOTIFY message to the S-CSCF in step S705. The S-CSCF then forwards the OK NOTIFY message to the AS, per step S707.

The same process may be repeated to notify the associated UE-3, which is also currently idle. More specifically, in step S709 the AS sends a line-idle notification to the S-CSCF, which in step S711 the S-CSCF forwards to the associated UE-3. In step S713 the associated UE-3 responds by sending an OK NOTIFY message to the S-CSCF, which the S-CSCF then forwards to the AS, per step S715. Accordingly, all the associated are notified that the line corresponding to the shared phone number is idle.

The example embodiments being thus described, it will be obvious that the same may be varied in many ways. Such variations are not to be regarded as a departure from the disclosed subject matter, and all such modifications are intended to be included within the scope of the disclosed subject matter.

I claim:

1. A notification method comprising:
    receiving an incoming call from a calling communication device;
    determining, by a server, a set of associated communication devices including at least two communication devices that traverse the server to access external communication devices;
    notifying, by the server, the set of associated communication devices that there is the incoming call;
    establishing, by the server, a connection between the calling communication device and at least one associated communication device in the set of associated communication devices;
    determining, by the server, a unique identifier for each communication device in the set of associated communication devices;
    notifying, by the server, each communication device in the set of associated communication devices of the connection based on the unique identifier of each communication device in the set of associated communication devices; and
    performing a conference procedure in response to an unconnected communication device being activated by establishing a new connection that is a multi-way conference connection and inviting each of the calling communication device, the at least one associated communication device, and the at least one unconnected communication device to the multi-way conference connection;
    wherein the set of associated communication devices have a shared identifier, the shared identifier being at least one of a group consisting of a shared phone number and a shared Uniform Resource Identifier.

2. The method of claim 1, wherein the receiving step is performed by a Session Initiation Protocol (SIP) application server.

3. The method of claim 1, the establishing step including,
    receiving answer confirmation from the at least one associated communication device; and
    forwarding the answer confirmation to the calling communication device such that the calling communication device establishes the connection with the at least one associated communication device.

4. The method of claim 3, the establishing step further including,
    sending a cancellation message to the at least one unconnected communication device;
    receiving a cancellation acknowledgement from the at least one unconnected communication device.

5. The method of claim 1, the notifying step including,
    sending a call notification to the at least one unconnected communication device, and
    receiving an acknowledgement of the notification,
    wherein the call notification informs the at least one unconnected communication device that a shared line is currently allocated to the at least one associated communication device.

6. The method of claim 1, the performing step including,
    receiving a join call request from the at least one unconnected communication device, the join call request indicating that the at least one unconnected communication device is activated, and
    joining the at least one unconnected communication device, the at least one associated communication device, and the calling communication device to a conference call in response to receiving the join call request.

7. The method of claim 6, wherein the joining includes,
    sending, to a media resource function, a first invitation with identification information corresponding to the at least one unconnected communication device upon receiving the join call request, such that the media resource function adds the at least one unconnected communication device to the conference call,
    sending a second invitation with identification information corresponding to the at least one associated communication device, such that the media resource function adds the at least one associated communication device to the conference call, and
    sending a third invitation with identification information corresponding to the calling communication device, such that the media resource function adds the calling communication device to the conference call.

8. The method of claim 1, further comprising:
    performing a ringing announcement corresponding to the set of associated communication devices.

9. The method of claim 1, further comprising:
    terminating the multi-way conference connection of at least one of the calling communication device, the at least one associated communication device, and the at least one unconnected communication device.

10. The method of claim 9, the terminating step including,
    ending a conference call between the calling communication device, the at least one associated communication device, and the at least one unconnected communication device; and
    sending an idle notification to each of the set of associated communication devices.

11. The method of claim 10, wherein the idle notification informs the set of associated communication devices that a shared line is currently available.

12. The method of claim 1, wherein the communication device is a user equipment device.

13. The method of claim 1, wherein the establishing establishes a connection between the calling communication device and the at least one associated communication device without routing the connection through the server.

14. The method of claim 1, wherein the performing establishes the multi-way conference connection without routing the multi-way conference connection through the server.

15. A notification apparatus comprising:
an application server configured to,
   receive an incoming call from a calling communication device,
   determine a set of associated communication devices including at least two communication devices that traverse the server to access external communication devices,
   notify the set of associated communication devices that there is the incoming call,
   establish a connection between the calling communication device and at least one associated communication device in the set of associated communication devices,
   determine a unique identifier for each communication device in the set of associated communication devices,
   notify at least one unconnected communication device in the set of associated communication devices of the connection based on the unique identifier of the at least one unconnected communication device,
   perform a conference procedure in response to an unconnected communication device being activated by establishing a new connection that is a multi-way conference connection and inviting each of the calling communication device, the at least one associated communication device, and the at least one unconnected communication device to the multi-way conference connection, and
   send an idle notification to each of the set of associated communication devices when the shared line is available;
   wherein the set of associated communication devices have a shared identifier, the shared identifier being at least one of a group consisting of a shared phone number and a shared Uniform Resource Identifier.

16. The notification apparatus of claim 15, further comprising:
a media resource function configured to interact with the application server in establishing a conference call including the calling communication device, the at least one associated communication device, and the at least one unconnected communication device.

17. The notification apparatus of claim 15, wherein the application server is further configured to establish a connection between the calling communication device and the at least one associated communication device without routing the connection through the server.

18. The notification apparatus of claim 15, wherein the application server is further configured to establish the multi-way conference connection without routing the multi-way conference connection through the server.

* * * * *